(12) United States Patent
Zhou et al.

(10) Patent No.: US 9,128,315 B2
(45) Date of Patent: Sep. 8, 2015

(54) BACKLIGHT MODULE AND LIQUID CRYSTAL DISPLAY

(75) Inventors: Gege Zhou, Shenzhen (CN); Shih-Hsiang Chen, Shenzhen (CN); Gang Yu, Shenzhen (CN); Weifeng Chen, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/511,660

(22) PCT Filed: Apr. 12, 2012

(86) PCT No.: PCT/CN2012/073859
§ 371 (c)(1),
(2), (4) Date: May 24, 2012

(87) PCT Pub. No.: WO2013/143169
PCT Pub. Date: Oct. 3, 2013

(65) Prior Publication Data
US 2015/0009447 A1  Jan. 8, 2015

(30) Foreign Application Priority Data

Mar. 26, 2012  (CN) .......................... 2012 1 0082899

(51) Int. Cl.
*G02F 1/1333*   (2006.01)
*G02F 1/1335*   (2006.01)

(52) U.S. Cl.
CPC ........ *G02F 1/133308* (2013.01); *G02F 1/1336* (2013.01); *G02F 1/133615* (2013.01); *G02F 2001/133328* (2013.01)

(58) Field of Classification Search
CPC .................... G02F 1/133308; G02F 1/133615; G02F 1/1336; G02F 2001/133328
USPC ...................................... 349/58–68
See application file for complete search history.

(56) References Cited

U.S. PATENT DOCUMENTS

| | | | |
|---|---|---|---|
| 5,797,213 A * | 8/1998 | Frick .............................. 43/54.1 |
| 7,134,780 B2 * | 11/2006 | Tsai .............................. 362/633 |
| 7,319,499 B2 * | 1/2008 | Peng .............................. 349/58 |
| 7,780,332 B2 * | 8/2010 | Li ................................. 362/632 |
| 2004/0084595 A1 * | 5/2004 | Tusavitz .................. 248/346.07 |

* cited by examiner

*Primary Examiner* — Bumsuk Won
*Assistant Examiner* — Charles Chang
(74) *Attorney, Agent, or Firm* — Mark M. Friedman

(57) ABSTRACT

A backlight module and a liquid crystal display are provided. The backlight module includes a plastic frame. The sidewalls of the plastic frame have an adjustable length. Each sidewall having the adjustable length includes at least two separated member slidably connected together. The present invention may flexibly set the plastic frame according to the size of the liquid crystal display, and need not specially configure the molds to produce the plastic frames for the different sizes of the liquid crystal display, thereby not only reducing the cost, but also increasing the manufacture efficiency.

12 Claims, 3 Drawing Sheets

BACKLIGHT MODULE AND LIQUID CRYSTAL DISPLAY

BACKGROUND OF THE INVENTION

1. Field of the Invention

The present invention relates to a liquid crystal displaying technology field, and more particularly to a backlight module and a liquid crystal display.

2. Description of the Prior Art

With the continuous development of a liquid crystal displaying technology, the demand for the function of every component of the liquid crystal display becomes more and more high.

Please refer to FIG. 1, FIG. 1 is an exploded schematic view of a partial structure of a liquid crystal display in the prior art. The liquid crystal display mainly comprises a liquid crystal panel 12, a backlight module providing the light source for the liquid crystal panel 12, and a front frame 11 used to fix the liquid crystal panel 12 to the backlight module. The backlight module includes a plastic frame 13, which is used to support the liquid crystal panel 12 and other components of the backlight module, such as an optical film, a light guide plate, a light bar, and so on.

At present, many different sizes of the liquid crystal displays appear in the market, therefore during the manufacture process of the backlight module, it needs to employ different dimensions of the moulds to produce different sizes of the plastic frames 13, thereby satisfying the different sizes of the liquid crystal displays. However, because the mould has a long manufacture cycle and a high price, it certainly results in the increase of the manufacture cost of the backlight module. Furthermore, once one sort of the liquid crystal displays is stopped producing, the mould used to produce the liquid crystal display will be eliminated, so that resulting in the waste of the resource.

Hence, it is necessary to solve the above problem existing in the prior art.

BRIEF SUMMARY OF THE INVENTION

One object of the present invention is to provide a backlight module to solve the technical problems of resulting in the higher production cost and the waste of the resource because of needing to employ different dimensions of the moulds to produce different sizes of the plastic frames for satisfying different sizes of the liquid crystal displays in the prior art.

For solving above problems, the present invention provides a backlight module, comprising a plastic frame. The plastic frame includes four sidewalls. The four sidewalls include a pair of first sidewalls in parallel and opposite each other, and a pair of second sidewalls in parallel and opposite each other. The first sidewalls are perpendicular to the second sidewalls, wherein the pair of the first sidewalls and the pair of the second sidewalls of the plastic frame all have an adjustable length, and the pair of the first sidewalls and the pair of the second sidewalls having the adjustable length all include a first separated member and a second separated member.

At least one pair of the sidewalls further include at least one third separated member, used to connect the first separated member or the second separated member. The third separated member adopts one structure of the first separated member and the second separated member, or adopts a combined structure of the two separated members.

In the backlight module of the present invention, the first separated member includes a first main body, a first support portion and a sliding channel. The first support portion is formed on the first main body and perpendicularly extends from one side of a vertical wall of the first main body. The sliding channel is formed on the first main body and located the other side of the vertical wall.

The second separated member includes a second main body, a second support portion and a sliding aperture. The second support portion is formed on the second main body and perpendicularly extends from one side of a vertical wall of the second main body. The sliding aperture is formed between the second support portion and the vertical wall of the second main body.

Wherein the first main body of the first separated member is inserted into the sliding aperture of the second separated member, and is slidably embedded into the sliding aperture; the second main body of the second separated member is inserted into the sliding channel of the first separated member, and is slidably embedded into the sliding channel.

In the backlight module of the present invention, the sliding channel is n-shaped. The sliding aperture is formed at a fracture position between the second support portion and the vertical wall of the second main body, and extends toward a connection portion of the second support portion and the vertical wall of the second main body from an end position of the second support portion.

In the backlight module of the present invention, two adjacent of the first separated members form an L-shaped first unit, used to connect two adjacent sidewalls. Two adjacent of the second separated members form an L-shaped second unit, used to connect the other two adjacent sidewalls.

The first unit has a first extension arm and a second extension arm perpendicularly connected each other. The structures of the first and second extension arms of the first unit are the same as those of the first separated member.

The second unit also has a first extension arm and a second extension arm perpendicularly connected each other. The structures of the first and second extension arms of the second unit are the same as those of the second separated member.

Wherein the first extension arm or the second extension arm of the first unit and the first extension arm or the second extension arm of the second unit can be directly or indirectly connected together to form one sidewall of the plastic frame.

Another object of the present invention is to provide a backlight module to solve the technical problems of resulting in the higher production cost and the waste of the resource because of needing to employ different dimensions of the moulds to produce different sizes of the plastic frames for satisfying different sizes of the liquid crystal displays in the prior art.

For solving above problems, the present invention provides a backlight module, comprising a plastic frame. The plastic frame includes four sidewalls. The four sidewalls all include a pair of first sidewalls in parallel and opposite each other and a pair of second sidewalls in parallel and opposite each other. The first sidewalls are perpendicular to the second sidewalls, wherein at least one pair of the sidewalls have an adjustable length, and each sidewall having the adjustable length includes at least two separated members slidably connected together.

In the backlight module of the present invention, the two separated members are a first separated member and a second separated member, respectively.

The first separated member includes a first main body, a first support portion and a sliding channel. The first support portion is formed on the first main body and perpendicularly extends from one side of a vertical wall of the first main body. The sliding channel is formed on the first main body and located the other side of the vertical wall.

The second separated member includes a second main body, a second support portion and a sliding aperture. The second support portion is formed on the second main body and perpendicularly extends from one side of a vertical wall of the second main body. The sliding aperture is formed between the second support portion and the vertical wall of the second main body.

Wherein the first main body of the first separated member is inserted into the sliding aperture of the second separated member, and is slidably embedded into the sliding aperture; the second main body of the second separated member is inserted into the sliding channel of the first separated member, and is slidably embedded into the sliding channel.

In the backlight module of the present invention, the sliding channel is n-shaped. The sliding aperture is formed at a fracture position between the second support portion and the vertical wall of the second main body, and extends toward a connection portion of the second support portion and the vertical wall of the second main body from an end position of the second support portion.

In the backlight module of the present invention, each sidewall having the adjustable length also includes at least one third separated member, used to connect the first separated member or the second separated member. The third separated member adopts one structure of the first separated member and the second separated member, or adopts a combined structure of the two separated members.

In the backlight module of the present invention, the pair of the first sidewalls and the pair of the second sidewalls all have the adjustable length, and all include the first separated member and the second separated member. Two adjacent of the first separated members form a L-shaped first unit, used to connect two adjacent sidewalls. Two adjacent of the second separated members form a L-shaped second unit, used to connect the other two adjacent sidewalls.

The first unit has a first extension arm and a second extension arm perpendicularly connected each other. The structures of the first and second extension arms of the first unit are the same as those of the first separated member.

The second unit also has a first extension arm and a second extension arm perpendicularly connected each other. The structures of the first and second extension arms of the second unit are the same as those of the second separated member.

Wherein the first extension arm or the second extension arm of the first unit and the first extension arm or the second extension arm of the second unit can be directly or indirectly connected together to form one sidewall of the plastic frame.

Another object of the present invention is to provide a liquid crystal display to solve the technical problems of resulting in the higher production cost and the waste of the resource because of needing to employ different dimensions of the moulds to produce different sizes of the plastic frames for satisfying different sizes of the liquid crystal displays in the prior art.

For solving above problems, the present invention provides a liquid crystal display. The liquid crystal display at least comprises a backlight module and a liquid crystal panel. The backlight module at least comprises a plastic frame. The plastic frame includes four sidewalls. The four sidewalls all include a pair of first sidewalls in parallel and opposite each other and a pair of second sidewalls in parallel and opposite each other. The first sidewalls are perpendicular to the second sidewalls, wherein at least one pair of the sidewalls have an adjustable length, and each sidewall having the adjustable length includes at least two separated members slidably connected together.

In the backlight module of the present invention, the two separated members are a first separated member and a second separated member, respectively.

The first separated member includes a first main body, a first support portion and a sliding channel. The first support portion is formed on the first main body and perpendicularly extends from one side of a vertical wall of the first main body. The sliding channel is formed on the first main body and located the other side of the vertical wall.

The second separated member includes a second main body, a second support portion and a sliding aperture. The second support portion is formed on the second main body and perpendicularly extends from one side of a vertical wall of the second main body. The sliding aperture is formed between the second support portion and the vertical wall of the second main body.

Wherein the first main body of the first separated member is inserted into the sliding aperture of the second separated member, and is slidably embedded into the sliding aperture; the second main body of the second separated member is inserted into the sliding channel of the first separated member, and is slidably embedded into the sliding channel.

In the backlight module of the present invention, the sliding channel is n-shaped. The sliding aperture is formed at a fracture position between the second support portion and the vertical wall of the second main body, and extends toward a connection portion of the second support portion and the vertical wall of the second main body from an end position of the second support portion.

In the backlight module of the present invention, each sidewall having the adjustable length also includes at least one third separated member, used to connect the first separated member or the second separated member. The third separated member adopts one structure of the first separated member and the second separated member, or adopts a combined structure of the two separated members.

In the backlight module of the present invention, the pair of the first sidewalls and the pair of the second sidewalls all have the adjustable length, and all include the first separated member and the second separated member. Two adjacent of the first separated members form a L-shaped first unit, used to connect two adjacent sidewalls. Two adjacent of the second separated members form a L-shaped second unit, used to connect the other two adjacent sidewalls.

The first unit has a first extension arm and a second extension arm perpendicularly connected each other. The structures of the first and second extension arms of the first unit are the same as those of the first separated member.

The second unit also has a first extension arm and a second extension arm perpendicularly connected each other. The structures of the first and second extension arms of the second unit are the same as those of the second separated member.

Wherein the first extension arm or the second extension arm of the first unit and the first extension arm or the second extension arm of the second unit can be directly or indirectly connected together to form one sidewall of the plastic frame.

Comparing with the prior art, the backlight module and the liquid crystal display of the present invention adopt the sidewalls having the adjustable length. The sidewalls having the adjustable length are formed by the slidable connection of multiple separated members, so the length of the sidewalls may be flexibly set to form the suitable plastic frame for the liquid crystal display according to the demand for the sizes of the liquid crystal displays. The backlight module and the liquid crystal display of the present invention need not specially design the moulds to produce the plastic frames for the different sizes of the liquid crystal displays, thereby not only reducing the cost, but also saving the resource and increasing the manufacture efficiency.

For more clearly and easily understanding above content of the present invention, the following text will take a preferred embodiment of the present invention with reference to the accompanying drawings for detail description as follows.

DETAILED DESCRIPTION OF THE PREFERRED EMBODIMENTS

The following description of every embodiment with reference to the accompanying drawings is used to exemplify a specific embodiment, which may be carried out in the present invention.

Figure 1:
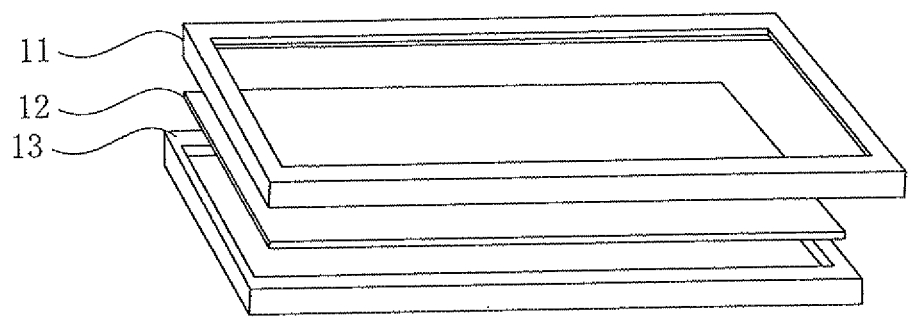
FIG. 1 is an exploded schematic view of a partial structure of a liquid crystal display in the prior art.
Figure 2:
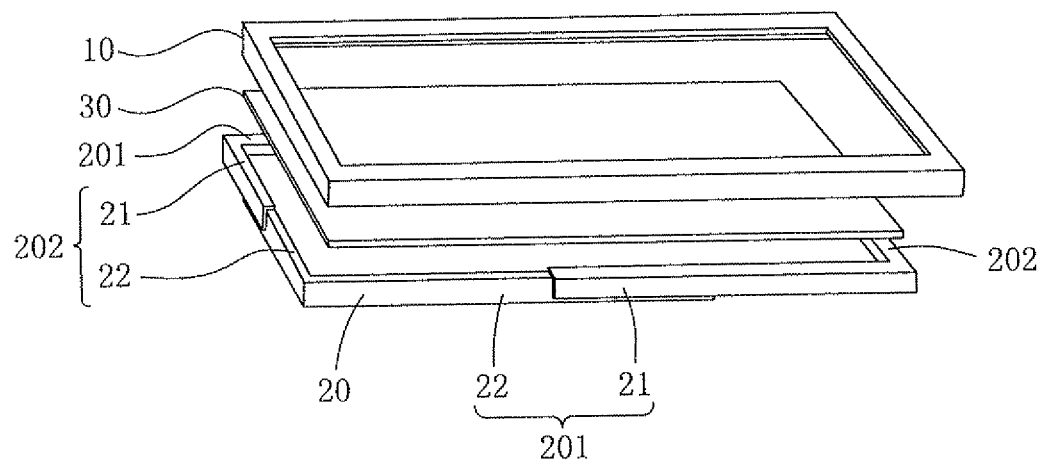
FIG. 2 is a structure schematic view of a preferred embodiment of a partial structure of a liquid crystal display of the present invention.

Please refer to FIG. 2, FIG. 2 is an exploded schematic view of a preferred embodiment of a partial structure of a liquid crystal display of the present invention.

The liquid crystal display mainly comprises: a liquid crystal panel 30, a backlight module providing a light source for the liquid crystal panel 30, and a front frame 10 used to fix the liquid crystal panel 30 to the backlight module.

The backlight module includes a plastic frame 20, used to support the liquid crystal panel 30 and also support other components of the backlight module. For more clearly highlighting the emphasis of the present invention, no details here for other components of the backlight module, and the following text will detailed explain the structure of the plastic frame 20 of the backlight module of the present invention.

In the backlight module of the present invention, the plastic frame 20 includes four sidewalls, namely two long sidewalls 201 (namely first sidewalls) in parallel and opposite each other and two short sidewalls 202 (namely second sidewalls) in parallel and opposite each other. The long sidewalls 201 are perpendicularly connected to the short sidewalls 202, wherein at least one pair of the sidewalls 201 or 202 in parallel and opposite each other have an adjustable length. The sidewalls 201 or 202 having the adjustable length all include, at least two separated members 21, 22 slidably connected together.

In the preferred embodiment shown by FIG. 2, the four sidewalls 201, 202 all have the adjustable length, and the four sidewalls 201, 202 all include at least two slidably connected separated members 21, 22.

Figure 3:
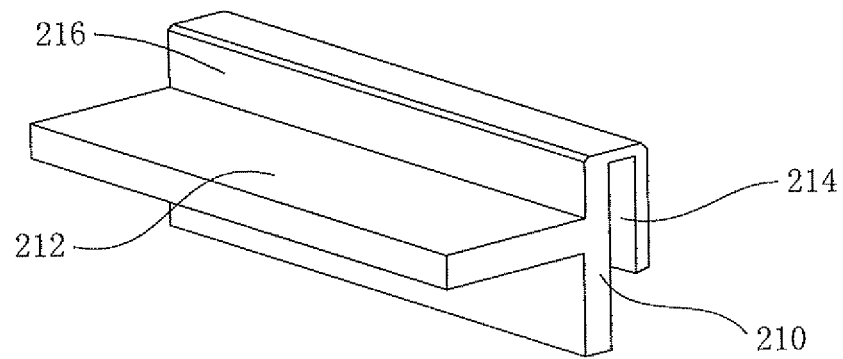
FIG. 3 is a structure schematic view of a preferred embodiment of a first separated member forming the sidewall of a plastic frame in a backlight module of the present invention.
Figure 4:
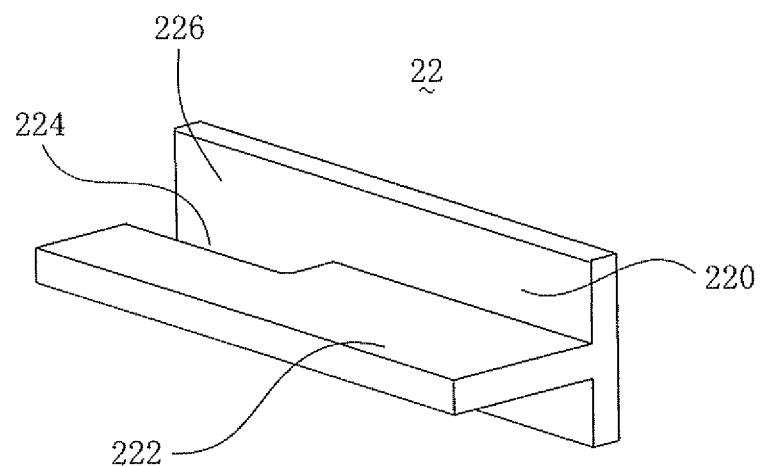
FIG. 4 is a structure schematic view of a preferred embodiment of a second separated member forming the sidewall of a plastic frame in a backlight module of the present invention.

Please refer to FIG. 3 and FIG. 4, the two slidably connected separated members 21, 22 are respectively a first separated member 21 and a second separated member 22.

Please refer to FIG. 3, the first separated member 21 includes a first main body 210, a first support portion 212 and a sliding channel 214. The first support portion 212 is formed on the first main body 210, and perpendicularly extends from one side of a vertical wall 216 of the first main body 210. The sliding channel 214 is generally n-shaped, formed on the first main body 210 and located the other side of the vertical wall 216.

Please refer to FIG. 4, the second separated member 22 includes a second main body 220, a second support portion 222 and a sliding aperture 224. The second support portion 222 is formed on the second main body 220 and perpendicularly extends from one side of a vertical wall 226 of the second main body 220. The sliding aperture 224 is formed between the second support portion 222 and the vertical wall 226. Specifically, as shown in FIG. 4, the sliding aperture 224 is formed at a fracture position between the second support portion 222 and the vertical wall 226, and extends toward a connection portion of the second support portion 222 and the vertical wall 226 from an end position of the second support portion 222. In the embodiment of FIG. 4, the second separated member 22 has the sliding aperture 53.

The assembly process of the plastic frame 20 of the preferred embodiment shown by FIGS. 2 to 4 is as follows.

In the manufacturing process of the liquid crystal display, the plastic frame 20 of the backlight module is formed by the four sidewalls. Take one sidewall (namely the short sidewall 202) as an example, the first separated member 21 composing the sidewall 202 adopts the structure shown by FIG. 3, and the second separated member 22 composing the sidewall 202 adopts the structure shown by FIG. 4. But in fact, in other embodiments, the first separated member 21 also may adopt the structure shown by FIG. 4, and the second separated member 22 also may adopt the structure shown by FIG. 3.

In the embodiment, the first main body 210 of the first separated member 21 is inserted into the sliding aperture 224 of the second separated member 22, and is slidably embedded into the sliding aperture 224. At the same time, the second main body 220 of the second separated member 22 is inserted into the sliding channel 214 of the first separated member 21, and is slidably embedded into the sliding channel 214. In this way, the first separated member 21 and the second separated member 22 not only can be fixed to each other for preventing detachment, but also can relatively slide, thereby adjusting the length of the sidewall.

Moreover, the first support portion 212 of the first separated member 21 and the second support portion 222 of the second separated member 22 are up and down partially overlapped for improving the force of supporting the liquid crystal panel 30. The first main portion 210 of the first separated member 21 and the second main portion 220 of the second separated member 22 are front and back partial overlapped, for further preventing the light leakage of the liquid crystal display.

Obviously, all the sidewalls 201, 202 of the plastic frame 20 of the backlight module of the present invention can be constructed by the first separated member 21 and the second separated member 22. The first separated member 21 and the second separated member 22 are slidably connected to flexibly control the length of the sidewalls according to the demand for the size of the liquid crystal display. There is no need to specially make the moulds used to produce the plastic frames for the different sizes of the liquid crystal display, so not only reducing the cost and avoiding waste of resources, but also increasing the manufacture efficiency.

Figure 5:
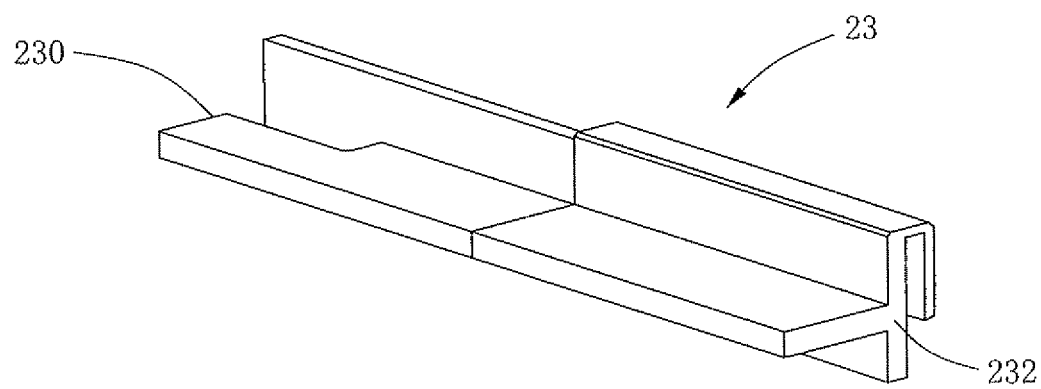
FIG. 5 is a structure schematic view of a preferred embodiment of a third separated member forming the sidewall of a plastic frame in a backlight module of the present invention.

Please refer to FIG. 5, in the present invention, the separated members constructing the sidewalls (such as the long sidewalls 201) of the plastic frame 20 also include a third separated member 23, used to connect the first separated member 21 or the second separated member 22, for further increasing the length of the sidewalls.

The third separated member 23 adopts one structure of the first separated member 21 and the second separated member 22, or adopts a combined structure of the two separated members.

In the embodiment shown by FIG. 5, the third separated member 23 adopts a combined structured of the first separated member 21 and the second separated member 22. In detail, the combined structure may be obtained by the prior manner, such as by connecting the first separated member 21 and the second separated member 22 together by the glue and so on, or by directly adopting the integral forming method. As shown in FIG. 5, one end 230 of the third separated member 23 may be connected to the first separated member 21, and the other end 232 thereof may be connected to the second separated member 22.

Certainly, it is easy to understand that, the sidewalls of the plastic frame 20 also may include multiple third separated members, such as three third separated members or five third separated members, for further expanding the adjustable range of the length of the sidewalls, thereby realizing the unlimited extension of the length of the sidewalls of the plastic frame 20.

Figure 6:
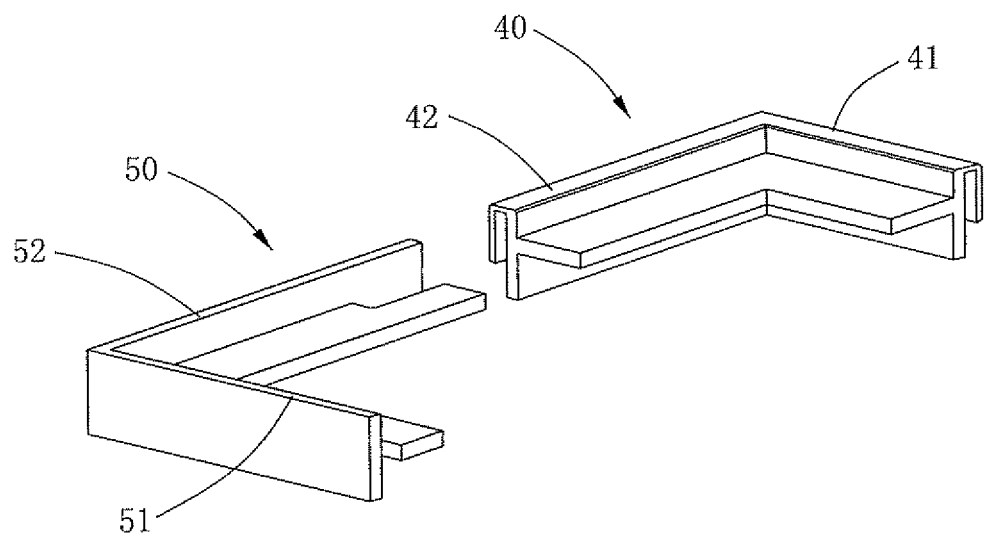
FIG. 6 is a structure schematic view of the preferred embodiment of the combination of the first separated member shown by FIG. 3 and the second separated member shown by FIG. 4 when actually assembling the plastic frame.

For more clearly understanding the present invention, the following text will take a preferred embodiment with reference to the content shown by FIGS. 2 and 6 to more detail describe the structure of the sidewalls of the plastic frame 20.

In the embodiment shown by FIG. 2, the two short sidewalls 202 and the two long sidewalls 201 are all constructed by the first separated members 21 and the second separated members 22. Two adjacent of the first separated members 21 may be designed to a first unit 40 having an L-shaped structure shown in FIG. 6, used to connect one pair of adjacent sidewalls (such as the long sidewall 201 and the short sidewall 202 adjacent to each other). Two adjacent of the second separated members 22 may be designed to a second unit 22 having an L-shaped structure shown in FIG. 6, used to connect the other pair of adjacent sidewalls. By the above design, the plastic frame 20 may be easily assembled.

Specifically, the first unit 40 shown by FIG. 6 has a first extension arm 41 and a second extension arm 42 perpendicularly connected each other. The structures of the first and second extension arms 41, 42 are the same as those of the first separated member 21 shown by FIG. 3. The second unit 50 shown by FIG. 6 also has a first extension arm 51 and a second extension arm 52 perpendicularly connected each other. The structures of the first and second extension arms 51, 52 are the same as those of the second separated member 22 shown by FIG. 4. Furthermore, when the second extension arm 42 (or the first extension arm 41) of the first unit 40 and the second extension arm 52 (or the first extension arm 51) of the first unit 50 are connected together, they can form one short sidewall 202 of the plastic frame 20 shown by FIG. 2. The connection method of the first unit 40 and the second unit 50 is the same as that of the first separated member 21 and the second separated member 22, so no more repeated herein.

Similarly, the other short sidewall 202 and the two long sidewalls 201 all may be constructed by the combined extension arms of the first unit 40 and the second unit 50 shown by FIG. 6.

Moreover, the present invention does not limit the first unit 40 and the second unit 50 shown by FIG. 6 to be L-shaped. In other embodiments, the first unit 40 and the second unit 50 also may adopt the half frame shaped structure (such as [), so the first unit 40 and the second unit 50 may be directly combined together or be indirectly combined by the third separated member 23 to form the sidewall of the plastic frame 20. But in this case, the formed plastic frame only may adjust the length of two opposite sidewalls (such as the long sidewalls 201), and may not adjust the other two opposite sidewalls (such as the short sidewalls 202), so this structure of the plastic frame is only adapted to a specific occasion. Furthermore, the first unit 40 and the second unit 50 also may adopt the combined structure of the L-shaped structure and the half frame shaped structure or adopt other new structure (not shown in drawing), so that the first unit 40 and the second unit 50 may be directly combined or be indirectly combined by the third separated member 23 to form the sidewall having the adjustable length.

Comparing with the prior art, multiple separated members are slidably connected to form the sidewalls, and further form the plastic frame. The plastic frame may be flexibly set according to the demand for the size of the liquid crystal display, and does not need to be produced by the special moulds for the different sizes of the liquid crystal display, thereby not only reducing the cost, but also saving the resources and increasing the manufacture efficiency.

In conclusion, although the present invention has been disclosed by above preferred embodiments, above preferred embodiments are not used to limit the present invention. One of ordinary skills in the art also can make all sorts of improvements and amendments within the principles of the present invention. Therefore, the protection scope of the present invention should be based on the scope defined by the appended claims.

What is claimed is:

1. A backlight module, comprising a plastic frame, the plastic frame including four sidewalls, the four sidewalls including a pair of first sidewalls in parallel and opposite each other, and a pair of second sidewalls in parallel and opposite each other, the first sidewalls being perpendicular to the second sidewalls, wherein the pair of the first sidewalls and the pair of the second sidewalls of the plastic frame all have an adjustable length, and the pair of the first sidewalls and the pair of the second sidewalls having the adjustable length all including a first separated member and a second separated member;

at least one pair of the sidewalls further including at least one third separated member, used to connect the first separated member or the second separated member; the third separated member adopting one structure of the first separated member and the second separated member or a combined structure of the two separated members.

2. The backlight module as claimed in claim 1, wherein the first separated member includes a first main body, a first support portion and a sliding channel; the first support portion is formed on the first main body and perpendicularly extends from one side of a vertical wall of the first main body; the sliding channel is formed on the first main body and located on the other side of the vertical wall:

the second separated member includes a second main body, a second support portion and a sliding aperture; the second support portion is formed on the second main body and perpendicularly extends from one side of a vertical wall of the second main body; the sliding aperture is formed between the second support portion and the vertical wall of the second main body;

wherein the first main body of the first separated member is inserted into the sliding aperture of the second separated member, and is slidably embedded into the sliding aperture; the second main body of the second separated member is inserted into the sliding channel of the first separated member, and is slidably embedded into the sliding channel.

3. The backlight module as claimed in claim 2, wherein the sliding channel is n-shaped; the sliding aperture is formed at a fracture position between the second support portion and the vertical wall of the second main body, and extends toward a connection portion of the second support portion and the vertical wall of the second main body from an end position of the second support portion.

4. The backlight module as claimed in claim 2, wherein two adjacent of the first separated members form an L-shaped first unit, used to connect two adjacent sidewalls; two adjacent of the second separated members form an L-shaped second unit, used to connect the other two adjacent sidewalls;

the first unit has a first extension arm and a second extension arm perpendicularly connected each other, the structures of the first and second extension arms of the first unit are the same as those of the first separated member;

the second unit also has a first extension arm and a second extension arm perpendicularly connected each other, the structures of the first and second extension arms of the second unit are the same as those of the second separated member;

wherein the first extension arm or the second extension arm of the first unit and the first extension arm or the second extension arm of the second unit can be directly or indirectly connected together to form one sidewall of the plastic frame.

5. A backlight module, comprising a plastic frame, the plastic frame including four sidewalk, the four sidewalls including a pair of first sidewalls in parallel and opposite each other and a pair of second sidewalls in parallel and opposite each other, the first sidewalls being perpendicular to the second sidewalls, wherein at least one pair of the sidewalls have an adjustable length, and each sidewall having the adjustable length including at least two separated members slidably connected together, wherein the two separated members are a first separated member and a second separated member, respectively;

wherein the first separated member includes a first main body, a first support portion and a sliding channel; the first support portion is formed on the first main body and perpendicularly extends from one side of a vertical wall of the first main body; the sliding channel is formed on the first main body and located on the other side of the vertical wall;

wherein the second separated member includes a second main body, a second support portion and a sliding aperture; the second support portion is formed on the second main body and perpendicularly extends from one side of a vertical wall of the second main body; the sliding aperture is formed between the second support portion and the vertical wall of the second main body;

wherein the first main body of the first separated member is inserted into the sliding aperture of the second separated member, and is slidably embedded into the sliding aperture; the second main body of the second separated member is inserted into the sliding channel of the first separated member, and is slidably embedded into the sliding channel.

6. The backlight module as claimed in claim 5, wherein the sliding channel is n-shaped; the sliding aperture is formed at a fracture position between the second support portion and the vertical wall of the second main body, and extends toward a connection portion of the second support portion and the vertical wall of the second main body from an end position of the second support portion.

7. The backlight module as claimed in claim 5, wherein each sidewall having the adjustable length also includes at least one third separated member, used to connect the first separated member or the second separated member; the third separated member adopts one structure of the first separated member and the second separated member, or adopts a combined structure of the two separated members.

8. The backlight module as claimed in claim 5, wherein the pair of the first sidewalls and the pair of the second sidewalls all have the adjustable length, and all include the first separated member and the second separated member; two adjacent of the first separated members form an L-shaped first unit, used to connect two adjacent sidewalls; two adjacent of the second separated members form an L-shaped second unit, used to connect the other two adjacent sidewalls;

the first unit has a first extension arm and a second extension arm perpendicularly connected each other, the structures of the first and second extension arms of the first unit are the same as those of the first separated member;

the second unit also has a first extension arm and a second extension arm perpendicularly connected each other, the structures of the first and second extension arms of the second unit are the same as those of the second separated member;

wherein the first extension arm or the second extension arm of the first unit and the first extension arm or the second extension arm of the second unit can be directly or indirectly connected together to form one sidewall of the plastic frame.

9. A liquid crystal display, wherein, the liquid crystal display at least comprising a backlight module and a liquid crystal panel, the backlight module at least comprising a plastic frame supporting the liquid crystal panel, the plastic frame including four sidewalls, the four sidewalls including a pair of first sidewalls in parallel and opposite each other and a pair of second sidewalk in parallel and opposite each other, the first sidewalls being perpendicular to the second sidewalls, wherein at least one pair of the sidewalls have an adjustable length, and each sidewall having the adjustable length including at least two separated members slidably connected together, wherein the two separated members are a first separated member and a second separated member, respectively;

the first separated member includes a first main body, a first support portion and a sliding channel; the first support portion is formed on the first main body and perpendicularly extends from one side of a vertical wall of the first main body, the sliding channel is formed on the first main body and located on the other side of the vertical wall;

the second separated member includes a second main body, a second support portion and a sliding aperture; the second support portion is formed on the second main body and perpendicularly extends from one side of a vertical wall of the second main body; the sliding aperture is formed between the second support portion and the vertical wall of the second main body;

wherein the first main body of the first separated member is inserted into the sliding aperture of the second separated member, and is slidably embedded into the sliding aperture; the second main body of the second separated member is inserted into the sliding channel of the first separated member, and is slidably embedded into the sliding channel.

10. The liquid crystal display as claimed in claim 9, wherein the sliding channel is n-shaped; the sliding aperture is formed at a fracture position between the second support portion and the vertical wall of the second main body, and extends toward a connection portion of the second support portion and the vertical wall of the second main body from an end position of the second support portion.

11. The liquid crystal display as claimed in claim 9, wherein each sidewall having the adjustable length also includes at least one third separated member, used to connect the first separated member or the second separated member; the third separated member adopts one structure of the first separated member and the second separated member, or adopts a combined structure of the two separated members.

12. The liquid crystal display as claimed in claim 9, wherein the pair of the first sidewalls and the pair of the second sidewalls all have the adjustable length, and all include the first separated member and the second separated member; two adjacent of the first separated members form an L-shaped first unit, used to connect two adjacent sidewalls; two adjacent of the second separated members form an L-shaped second unit, used to connect the other two adjacent sidewalls;

the first unit has a first extension arm and a second extension arm perpendicularly connected each other, the structures of the first and second extension arms of the first unit are the same as those of the first separated member;

the second unit also has a first extension arm and a second extension arm perpendicularly connected each other, the structures of the first and second extension arms of the second unit are the same as those of the second separated member;

wherein the first extension arm or the second extension arm of the first unit and the first extension arm or the second extension arm of the second unit can be directly or indirectly connected together to form one sidewall of the plastic frame.

\* \* \* \* \*